US012449114B1

(12) United States Patent
Lin

(10) Patent No.: US 12,449,114 B1
(45) Date of Patent: Oct. 21, 2025

(54) LIGHTING DEVICE

(71) Applicant: Qianhai Qianyi (Shenzhen) Technology Co., Ltd., Guangdong (CN)

(72) Inventor: Bingchen Lin, Guangdong (CN)

(73) Assignee: QIANHAI QIANYI (SHENZHEN) TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 19/093,414

(22) Filed: Mar. 28, 2025

(30) Foreign Application Priority Data

Mar. 19, 2025 (CN) ......................... 202520491054.6

(51) Int. Cl.
*F21V 21/08* (2006.01)
*F21Y 113/00* (2016.01)
*F21Y 115/10* (2016.01)

(52) U.S. Cl.
CPC ....... *F21V 21/0816* (2013.01); *F21Y 2113/00* (2013.01); *F21Y 2115/10* (2016.08)

(58) Field of Classification Search
CPC ............. F21V 21/0816; F21Y 2113/00; F21Y 2115/10
See application file for complete search history.

(56) References Cited

U.S. PATENT DOCUMENTS 5,957,572 A * 9/1999 Wedekind ............... F21V 23/02 362/147
7,014,332 B2 * 3/2006 Sergio ..................... F21V 21/02 362/147
7,857,478 B1 * 12/2010 Keller ................. F21V 21/0816 362/108
8,714,787 B2 * 5/2014 McGehee ................. F21K 9/20 362/147
2007/0070635 A1 * 3/2007 Tao ........................... F21L 4/00 362/362
2013/0272000 A1 * 10/2013 Pearson .................... F21S 4/28 362/362
2018/0172254 A1 * 6/2018 Liang .................. F21V 21/0816

FOREIGN PATENT DOCUMENTS

CN 103244915 A * 8/2013
CN 221743987 U * 9/2024

OTHER PUBLICATIONS

English translation of Gong CN-221743987-U (Year: 2024).*
English translation of Huang CN-103244915-A (Year: 2013).*

* cited by examiner

*Primary Examiner* — Evan P Dzierzynski

(57) ABSTRACT

A lighting device includes a lighting device body and a connection structure. The lighting device body includes a mounting shell, the light emitting portion, a lampshade and a power supply device. The mounting shell is provided with a receiving groove. The light emitting portion is located in the receiving groove. The lampshade is configured for the light emitted by the light emitting portion to pass through the lampshade and irradiate the outside. The lampshade is configured on the mounting shell. The power supply device is electrically connected to the light emitting portion to energize the light emitting portion. The connection structure includes a first connection strip, a second connection strip and a fixing member, the fixing member connects the first connection strip and the second connection strip. The connection structure is connected to the mounting shell, and the lighting device is detachably disposed on an external object.

19 Claims, 5 Drawing Sheets

LIGHTING DEVICE

CROSS-REFERENCE TO RELATED APPLICATIONS

The application claims priority of Chinese patent application CN2025204910546, filed on Mar. 19, 2025, which is incorporated herein by reference in its entireties.

TECHNICAL FIELD

The present invention relates to the technical field of lighting, in particular to a lighting device.

BACKGROUND

The lighting devices are often used by people in daily life, however, most lighting devices need to be handheld or placed on a flat table or on the ground for use. It is inconvenient for users to hold lighting devices, when the lighting device is used outdoors, it is not easy to find a suitable place to place the lighting device. If the lighting devices are used with a hanging manner, which may be has a risk that the lighting device will be instability. To this end, the present invention provides a lighting device that can effectively solve the above problems.

SUMMARY

In order to solve the technical problem, the technical scheme provided by the present invention is as follows.

A lighting device includes a lighting device body and a connection structure.

The lighting device body includes a mounting shell, the mounting shell is provided with a receiving groove, a light emitting portion for emitting light, the light emitting portion is located in the receiving groove, a lampshade is configured for the light emitted by the light emitting portion to pass through the lampshade and irradiate the outside, the lampshade is configured on the mounting shell, a power supply device is electrically connected to the light emitting portion to energize the light emitting portion.

The connection structure includes a first connection strip, a second connection strip and a fixing member, the fixing member connects the first connection strip and the second connection strip.

The connection structure is connected to the mounting shell, and the lighting device is detachably disposed on an external object.

Furthermore, the first connection strip is provided with a first through hole, the second connection strip is provided with a second through hole, the first connection strip and the second connection strip are bridged to each other, the fixing member is located in the first through hole and the second through hole, so that the first connection strip is locked with the second connection strip, and the connection structure is detachably connected with the mounting shell.

Furthermore, the mounting shell is provided with a third through hole, one end of the first connection strip and one end of the second connection strip passes through the third through hole via inside of the receiving groove.

Furthermore, an inner wall of the mounting shell is provided with a convex, the convex is located between the two third through holes, the connection structure is provided with a fourth through hole, the fourth through hole is located between the first connection strip and the second connection strip, the convex passes through the fourth through hole, and the connection structure is detachably connected with the mounting shell.

Furthermore, the first connection strip is provided with a boss, and the first through hole penetrates the boss.

Furthermore, a length of the second connection strip is greater than a length of the first connection strip.

Furthermore, the fixing member includes a plug portion, the plug portion is configured to insert into the first through hole and the second through hole, the sizes of the plug portion, the first through hole and the second through hole match each other.

Furthermore, the fixing member further includes a handle portion, the handle portion is connected to one end of the plug portion, and the handle portion protrudes from the plug portion.

Furthermore, the light emitting portion includes a light board, a plurality of LED lamp beads are configured on the light board, the light board is arranged around an inner wall of the edge of the mounting shell.

Furthermore, the power supply device includes a battery compartment, a control switch and a control mainboard, the battery compartment is configured on an inner wall of the mounting shell, the battery compartment is configured to install the battery, the battery compartment and the light board are electrically connected to the control mainboard respectively, the control mainboard is configured to control the voltage and change a flashing mode of the LED lamp beads, the control switch is configured on the mounting shell, the control switch is electrically connected to the control mainboard, and the control switch is configured to control the power on and off of the light board and switch the flashing mode of the LED lamp beads.

Furthermore, the battery compartment is provided with a shielding portion, the shielding portion is configured to prevent the batteries installed in the battery compartment from leaving the battery compartment.

Furthermore, the shielding portion covers part of the battery compartment.

Furthermore, an inner wall of the lampshade is provided with the plurality of clamping strips, when the lampshade is covered on the mounting shell, the clamping strips are located on the top of the battery compartment to prevent the batteries installed in the battery compartment from leaving the battery compartment.

Furthermore, the battery compartment further includes a cover body, the cover body is detachably connected to the mounting shell, and the cover body prevents the batteries installed in the battery compartment from leaving the battery compartment.

Furthermore, the convex is provided with a first positioning groove, the inner wall of the lampshade is provided with a first positioning column, when the lampshade is covered on the mounting shell, one end of the first positioning column is inserted into the first positioning groove.

Furthermore, a plurality of pressing blocks are arranged on the inner wall of the edge of the lampshade, when the lampshade is covered on the mounting shell, the pressing blocks abut against the lamp board.

Furthermore, the lampshade further includes a reflective strip, the lampshade is provided with a mounting groove, and the reflective strip is detachably installed in the mounting groove.

Furthermore, the reflective strip is provided with a second positioning column, the mounting groove is provided with a second positioning groove, the second positioning column inserts into the second positioning groove, and the reflective strip is detachably connected to the lampshade.

Furthermore, the power supply device includes a wire, the control switch, the control mainboard and a power connector, one end of the wire is electrically connected to the light board, the control board is integrated in the control switch, the control switch is configured on the wire, the control switch is configured to control the power on and off of the light board and switch the flashing mode of the LED lamp beads, the power connector is connected to the other end of the wire, and the power connector is configured to connect to an external power source.

Furthermore, the inner wall of the edge of the mounting shell is provided with a plurality of slots, the inner wall of the edge of the lampshade is provided with a plurality of clip blocks, when the lampshade is covered on the mounting shell, the clip blocks are clamped into the slots, and the lampshade is detachably connected with the mounting shell.

The beneficial effects of the present invention as follow, the present invention discloses the lighting device, one or more connection structure are connected to the lighting device body. The connection structure includes the first connection strip which provides with the first through hole, the second connection strip which provides with the second through hole and the fixing member. The first connection strip is bridged on the second connection strip, the fixing member is plugged into the first through hole and the second through hole to connected the first connection strip with the second connection strip. The lighting device can be detachably installed on an external object through the connection structure, which is convenient for users to use in more scenarios. The structure is simple and reliable, it is convenient for users to install and disassemble, and the lighting device has multiple lighting modes that can be choosed, which greatly increases the fun.

BRIEF DESCRIPTION OF THE DRAWINGS

In order to explain the technical solutions of the embodiments of the present invention more clearly, the following will briefly introduce the accompanying drawings used in the embodiments. The drawings in the following description are only some embodiments of the present invention. Those of ordinary skill in the art can obtain other drawings based on these drawings without creative work.

The present invention is further described below in detail in combination with the accompanying drawings and embodiments.

DETAILED DESCRIPTION OF THE EMBODIMENTS

Figure 1:
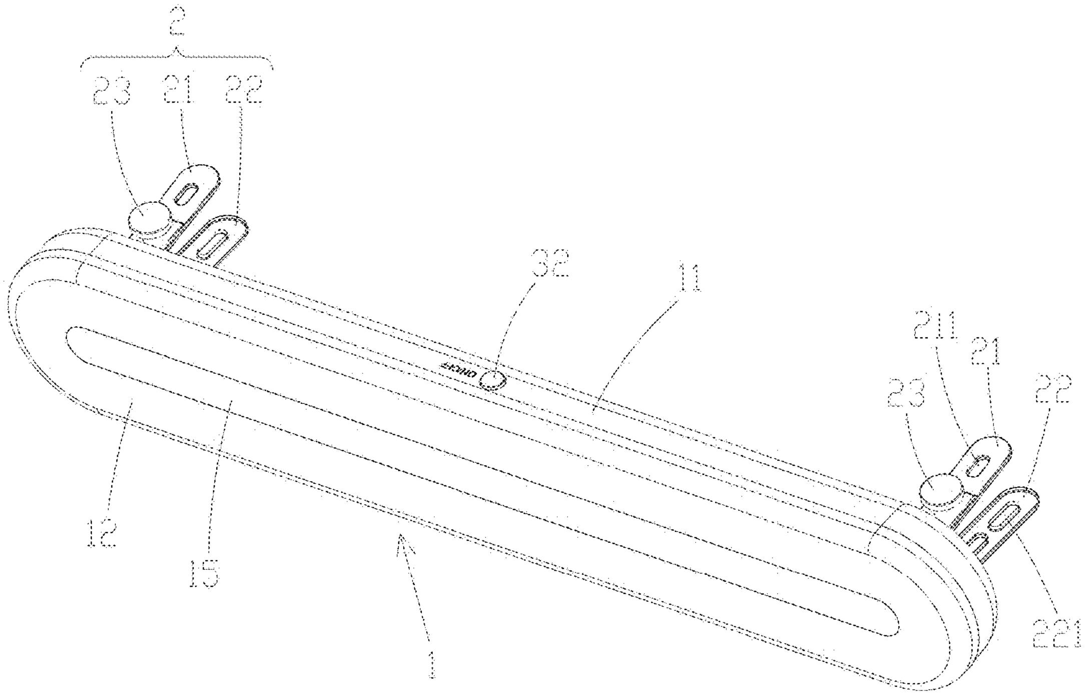
FIG. 1 is a stereogram diagram according to a lighting device.
Figure 2:
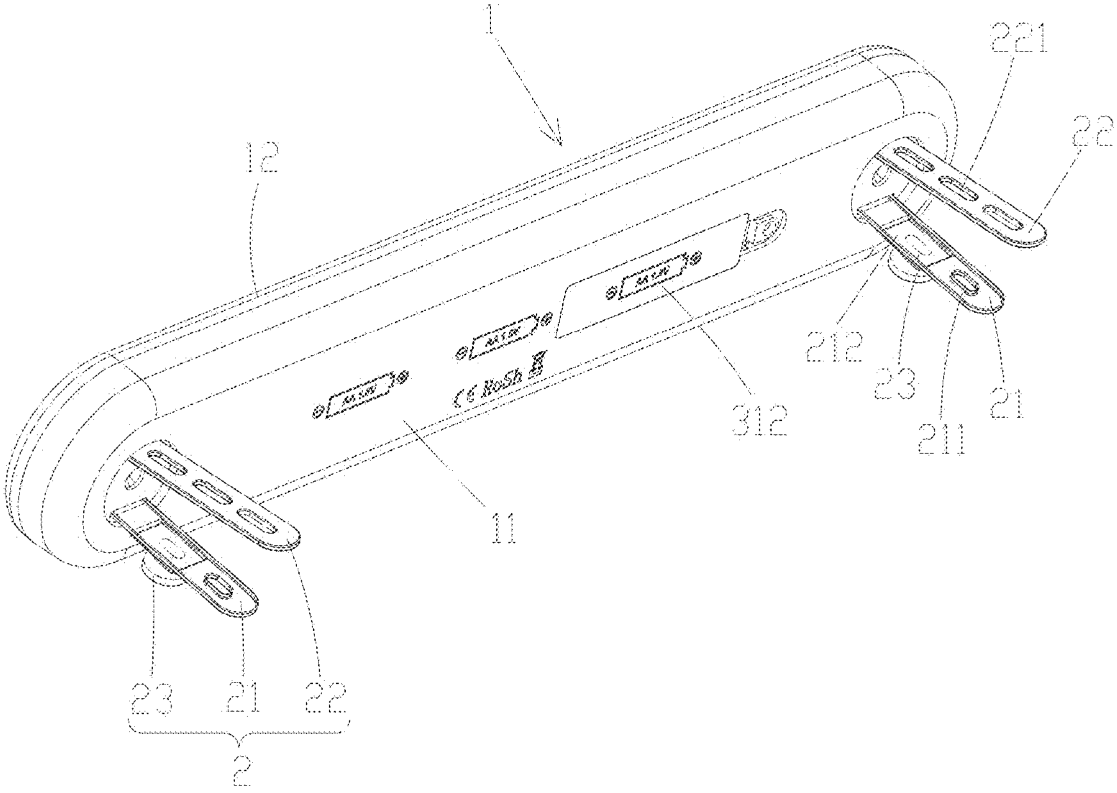
FIG. 2 is stereogram diagram of another view according to a lighting device.
Figure 3:
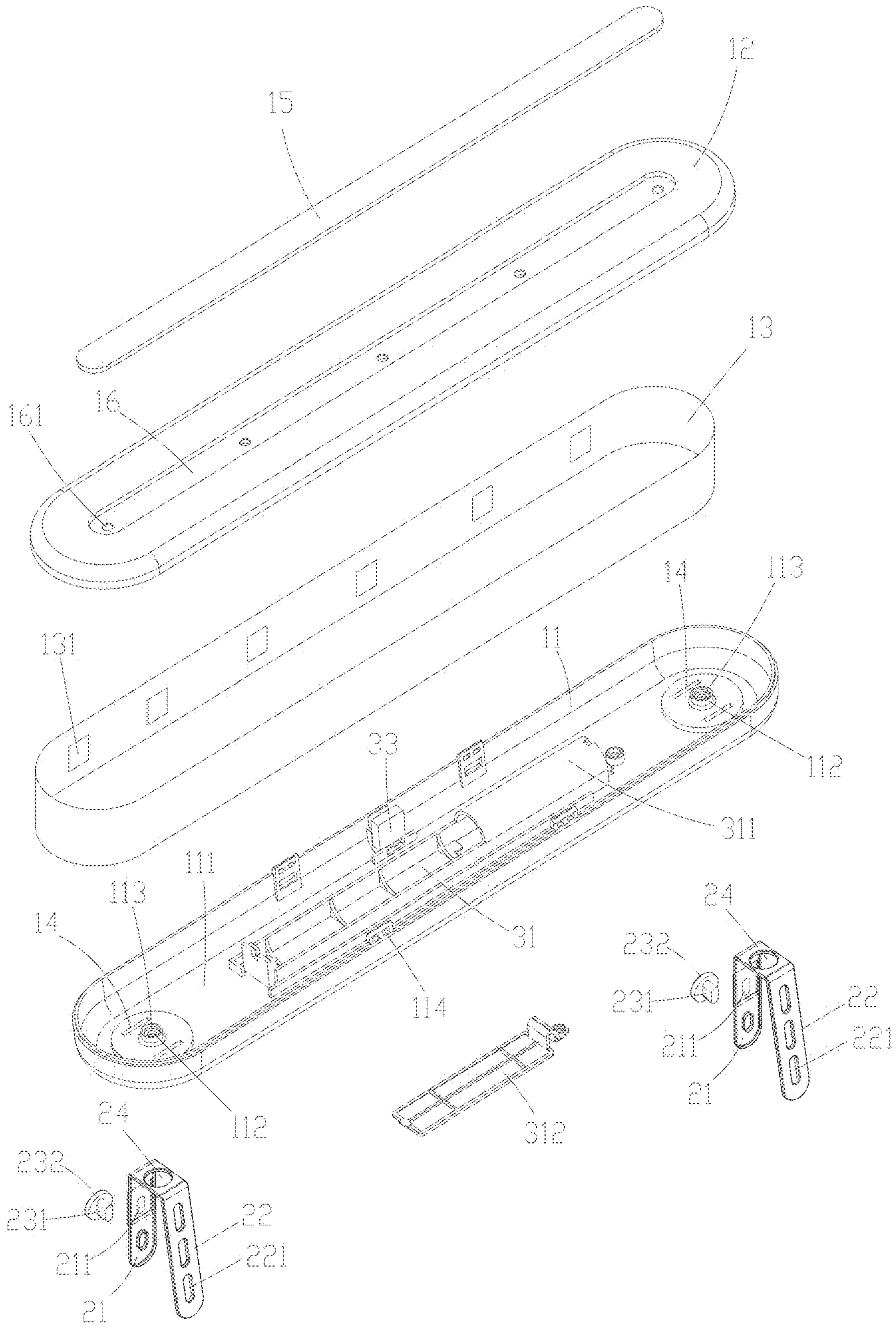
FIG. 3 is an exploded diagram according to a lighting device.
Figure 4:
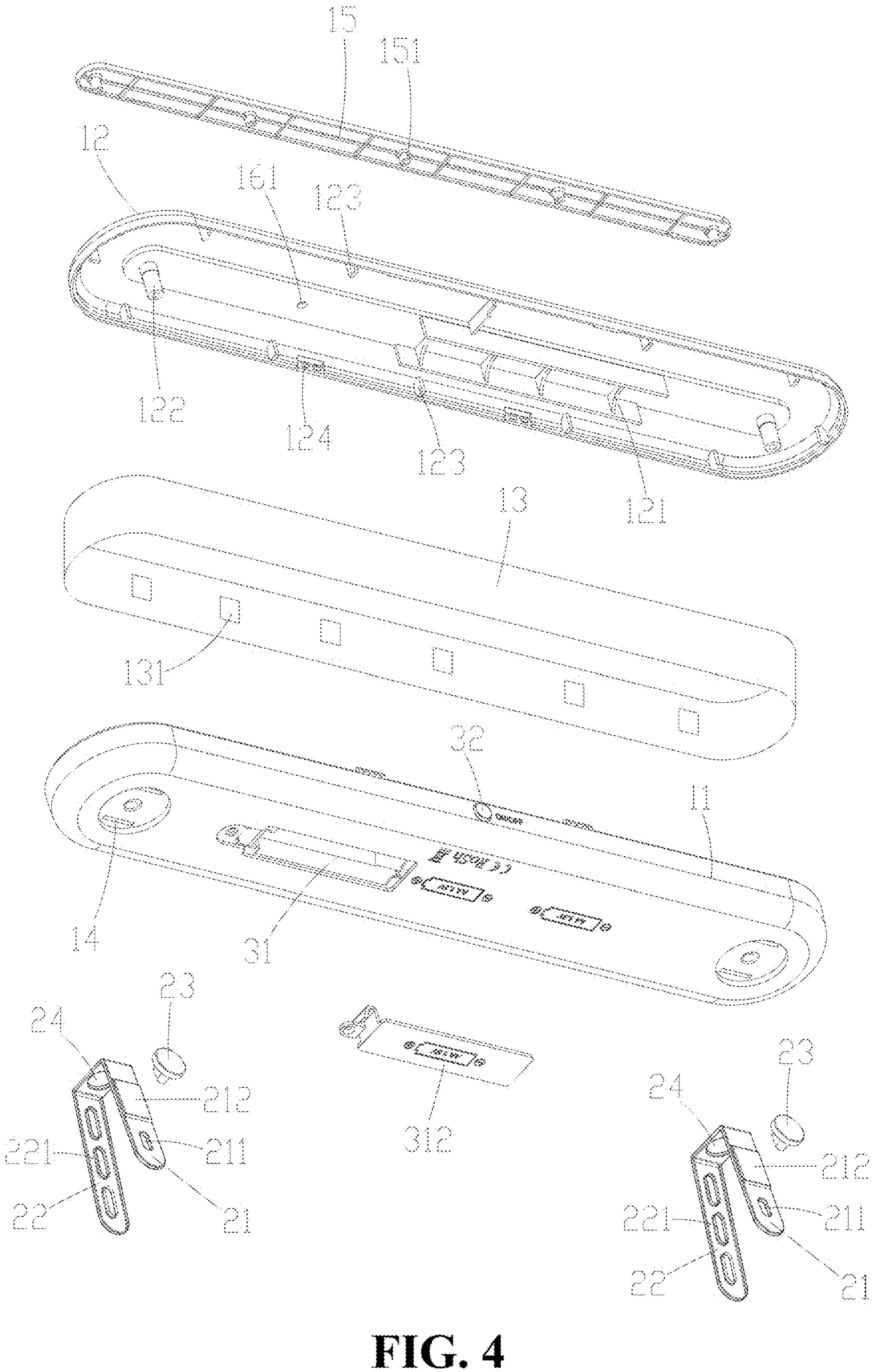
FIG. 4 is an exploded diagram of another view according to a lighting device.
Figure 5:
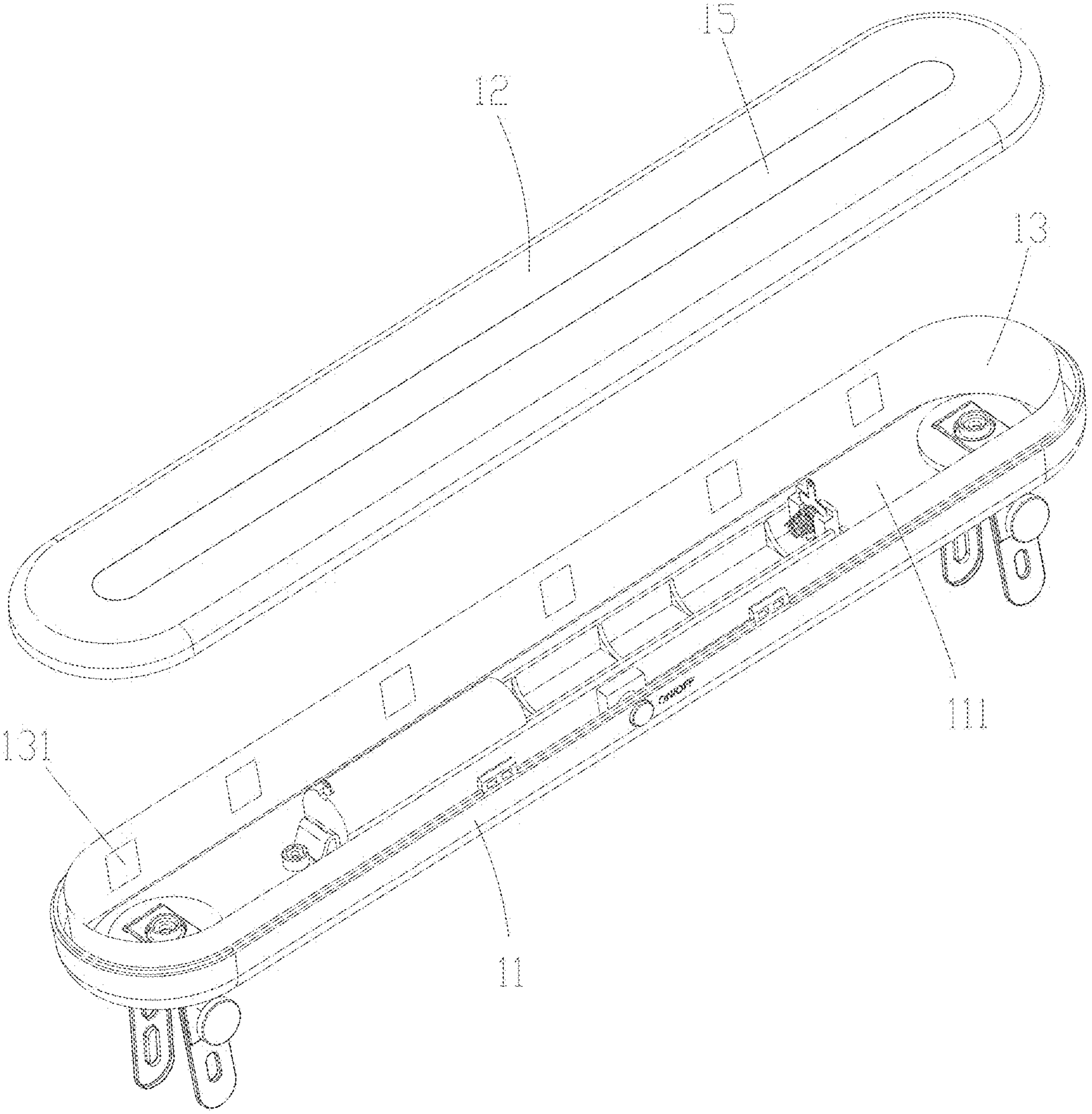
FIG. 5 is another exploded diagram according to a lighting device.

The technical solutions in the embodiments of the present invention will be clearly and completely described below in conjunction with the accompanying drawings in the embodiments of the present invention. Apparently, the described embodiments are only a part of the embodiments of the present invention, rather than all the embodiments. Based on the embodiments in the present invention, all other embodiments obtained by those ordinarily skilled in the art without doing creative work shall fall within the protection scope of the present invention.

Referring to FIG. 1 to FIG. 5, the present invention discloses a lighting device, which includes a lighting device body 1 and a connection structure 2.

The lighting device body 1 includes a mounting shell 11, the mounting shell 11 is provided with a receiving groove 111, a light emitting portion for emitting light, the light emitting portion is located in the receiving groove 111, a lampshade 12 is configured for the light emitted by the light emitting portion to pass through the lampshade 12 and irradiate the outside, the lampshade 12 is configured on the mounting shell 11, a power supply device is electrically connected to the light emitting portion to energize the light emitting portion.

The connection structure 2 includes a first connection strip 21, a second connection strip 22 and a fixing member 23, the fixing member 23 connects the first connection strip 21 and the second connection strip 22.

The connection structure 2 is connected to the mounting shell 11, so that the lighting device is detachably disposed on an external object.

In this embodiment, the light emitting portion is located in the receiving groove 111, the power supply device is electrically connected to the light emitting portion, the lampshade 12 is covered on the mounting shell 11, the light emitted by the light emitting portion irradiates to the outside through the lampshade 12. One or more connection structures are connected to the installation shell 11, the connection structure includes the first connection strip 21 provided with a first through hole 211, the second connection strip 22 provided with a second through hole 221 and the fixing member 23. When in use, the first connection strip 21 and the second connection strip 22 are overlapped on both sides of the object respectively, the first connection strip 21 and the second connection strip 22 are overlapped, so that the positions of the first through hole 211 and the second through hole 221 are aligned, then the fixing member 23 is inserted into the first through hole 211 and the second through hole 221, thereby to lock the first connection strip 21 and the second connection strip 22, so that the lighting device can be detachably connected to the external object. When the lighting device needs to be disassembled, it is only necessary to pull the fixing member 23 out of the first through hole 211 and the second through hole 221, the first connection strip 21 and the second connection strip 22 can be separated, the lighting device can be removed from the external object. Through the above mentioned structural design, the lighting device can be detachably installed on an object with tubular or columnar structure (for example, a beam or a leg on the object such as a table, a chair, a tent, etc.) via the connection structure 2, which is convenient for users to use in multiple scenarios.

In this embodiment, the fixing member 23 includes a handle portion 232 and a plug portion 231, one end of the plug portion 231 is connected to the handle portion 232, the handle portion 232 protrudes from the plug portion 231, this design is convenient for users to pinch the fixing member 23 with their fingers. The plug portion 231 is configured to insert into the first through hole 211 and the second through hole 221, the sizes of the plug portion 231, the first through hole 21 land the second through hole 221 match each other.

A length of the second connection strip 22 is greater than a length of the first connection strip 21, When in use, the second connection strip 22 is bent toward the first connection strip 21. The first connection strip 21 is provided with a boss 212, at least one the first through hole 211 penetrates the boss 212, the boss 212 makes the first through hole 211 and the second through hole 221 to close to each other, thereby the connection is more stable after the plug portion 231 is inserted into the first through hole 211 and the second through hole 221.

In this embodiment, the connection structure 2 is provided with a fourth through hole 24, the fourth through hole 24 is located between the first connection strip 21 and the second connection strip 22, the mounting shell 11 is provided with a convex 112, both sides of the convex 112 are provided with the two third through holes 14. A width of the third through hole 14 is not less than a width of the first connection strip 21 and the second connection strip 22. The first connection strip 21 and the second connection strip 22 pass through the two third through holes 14 via the inside of the mounting shell 11 respectively, until the convex 112 clamps in the fourth through hole 24. Through the above mentioned structural design, the connection structure 2 and the mounting shell 11 are detachably connected.

In this embodiment, the light emitting portion includes a light board 13, a plurality of LED lamp beads 131 are configured on the light board 13. The light board 13 is made of flexible material. The light board 13 is arranged around an inner wall of the edge of the mounting shell 11. Through the above mentioned structural design, by rationally planning the installation position of the light board 13, the space in the receiving groove 111 can be saved.

In this embodiment, the lampshade 12 is made of transparent or translucent material, which allows the light emitted by the LED lamp beads 131 to irradiate the outside. A plurality of pressing blocks 123 are arranged on an inner wall of the edge of the lampshade 12. When the lampshade 12 is covered on the light board 13, the pressing blocks 123 can just press on the light board 13, making the position of the light board 13 more stable.

In this embodiment, the power supply device is located in the receiving groove 111, the power supply device includes a battery compartment 31, a control switch 32 and a control mainboard 33. The battery compartment 31 is located in the receiving groove 111, the battery compartment 31 is provided with a shielding portion 311, the shielding portion 311 covers part of the battery compartment 31. Correspondingly, a plurality of clamping strips 121 are provided on the inner wall of the lampshade 12, when the lampshade 12 is covered on the mounting shell 11, the clamping strips 121 shade over the top of the battery compartment 31. The shielding portion 311 cooperates with the clamping strips 121 to prevent the battery in the battery compartment 31 from falling out. The battery compartment 31 further includes a cover body 312, the cover body 312 is detachably connected to the mounting shell 11, making it convenient for users to replace the battery. The control mainboard 33 and the battery compartment 31 are electrically connected. The light board 13 and the control mainboard 33 are electrically connected, the control mainboard 33 is configured to convert the voltage. The control mainboard 33 furth integrates the programs of multiple lighting modes of the LED lamp beads 131, the LED lamp beads 131 can realize multiple lighting modes such as constant lighting, flashing, and color changing, which can provide more fun for users. The control switch 32 is configured on the mounting shell 11, the control switch 32 and the control mainboard 33 are electrically connected. The user can control the power on and off of the LED lamp beads and switch multiple lighting modes by operating the control switch 32, only one control switch 32 is configured to complete the above operation, which has high integration and saves space.

Figure 6:
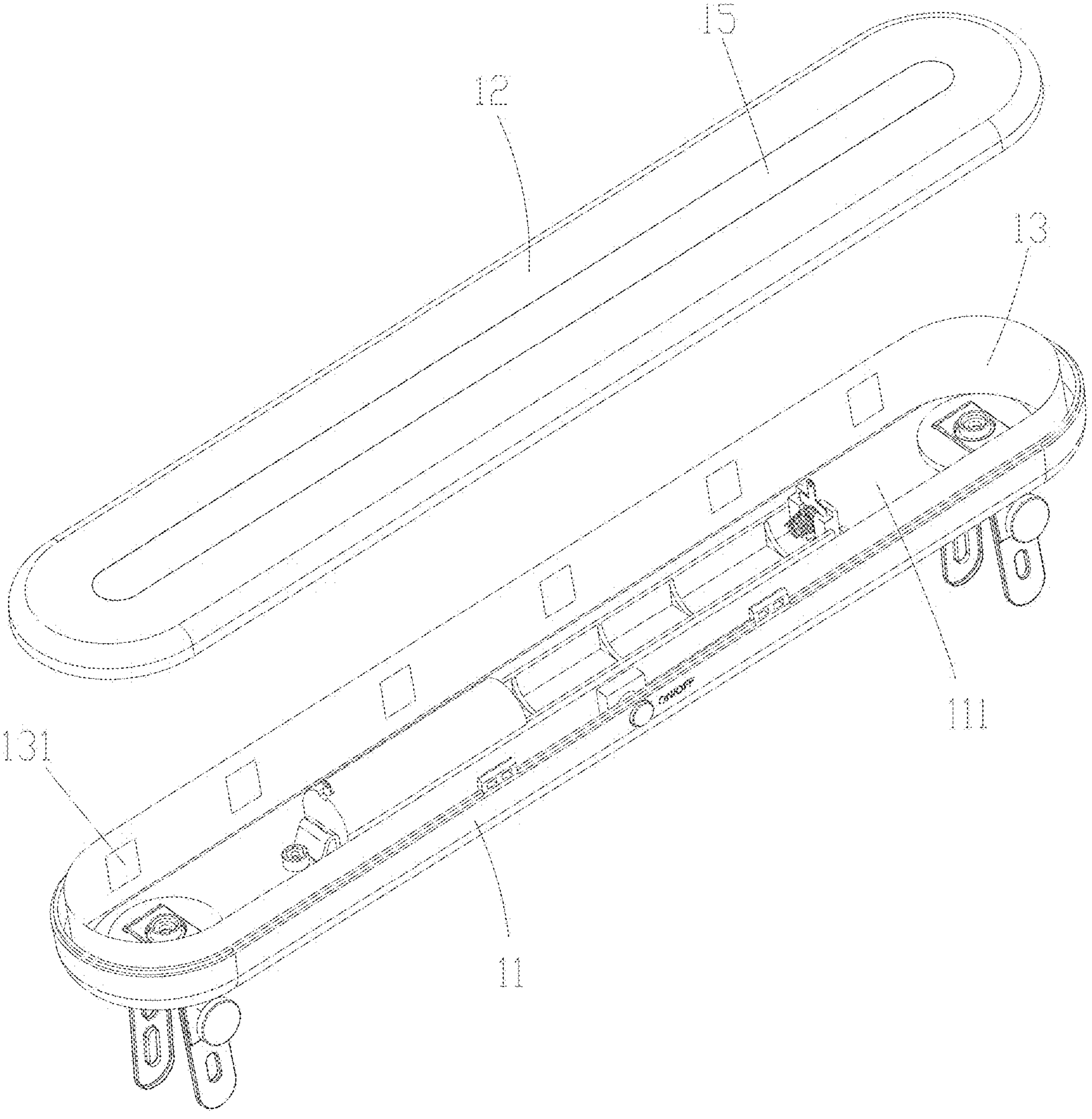
FIG. 6 is a stereogram diagram according to another embodiment.

Referring to FIG. 6, in another embodiment, the power supply device is configured outside the receiving groove 111, the power supply device includes a wire 17, the control switch 32, the control mainboard 33 and a power connector 18. The control board 33 is integrated in the control switch 32. The control mainboard 33 is configured on the wire 17, one end of the wire 17 is electrically connected to the light board 13, the power connector 18 is configured to the other end of the wire 17. The power connector 18 can be USB, Type-C, etc. The power connector 18 can be plugged into an external power supply to power the lighting device.

In this embodiment, the inner wall of the edge of the mounting shell 11 is provided with a plurality of slots 114. The inner wall of the edge of the lampshade 12 is provided with a plurality of clip blocks 124. When the lampshade 12 is covered on the mounting shell 11, the clip blocks 124 are clamped into the slots 114, thereby the lampshade 12 is detachably connected to the mounting shell 11. Through the above mentioned structural design, the assembly method which the slots 114 cooperates with the clip blocks 124, can increase the assembly efficiency during production. The inner wall of the lampshade 12 is further provided with a first positioning column 122. The convex 112 is provided with a first positioning groove 113, when the lampshade 12 is covered on the mounting shell 11, one end of the first positioning column 122 is inserted into the first positioning groove 113, thereby the connection between the lampshade 12 and the mounting shell 11 is more stable.

In this embodiment, the lampshade 12 further includes a reflective strip 15, the lampshade 12 is provided with a mounting groove 16, a plurality of second positioning grooves 161 arc provided inside the mounting groove 16. The reflective strip 15 is provided with a plurality of the second positioning columns 151, when the reflective strip 15 is located in the mounting groove 16, one end of the second positioning column 151 is inserted into the second positioning groove 161, thereby the reflective strip 15 is detachably configured on the lampshade 12, the reflective strip 15 has a function of reflecting light which can serve as a warning to the surrounding crowd.

As described above, one or more embodiments are provided in conjunction with the detailed description, The specific implementation of the present invention is not confirmed to be limited to that the description is similar to or similar to the method, the structure and the like of the present invention, or a plurality of technical deductions or substitutions are made on the premise of the conception of the present invention to be regarded as the protection of the present invention.

What is claimed is:

1. A lighting device, comprising:

a lighting device body and a connection structure, wherein the lighting device body comprises a mounting shell, the mounting shell is provided with a receiving groove, a light emitting portion for emitting light, the light emitting portion is located in the receiving groove, a lampshade is configured for the light emitted by the light emitting portion to pass through the lampshade and irradiate the outside, the lampshade is configured on the mounting shell, a power supply device is electrically connected to the light emitting portion to energize the light emitting portion, the connection structure comprises a first connection strip, a second connection strip and a fixing member, the first connection strip and the second connection strip are bridged to each other by an interconnection part, the fixing member connects the first connection strip and the second connection strip, wherein the connection structure is detachably connected to the mounting shell in a manner that the mounting shell is provided with two third through holes, one end of the first connection strip and one end of the second connection strip pass through the third through holes respectively via inside of the receiving groove, with the interconnection part located inside of the receiving groove, and the one end of the first connection strip and the one end of the second connection strip extending outside of a side of the mounting shell away from the lampshade; and the one end of first connection strip is provided with a plurality of first through holes, the one end of the second connection strip is provided with a plurality of second through holes, the fixing member is located in one of the first through holes and one of the second through holes to lock the first connection strip with the second connection strip, thereby the lighting device is detachably disposed on an external object through the connection structure.

2. The lighting device according to claim 1, wherein an inner wall of the mounting shell is provided with a convex, the convex is located between the two third through holes, the connection structure is provided with a fourth through hole, the fourth through hole is located in the interconnection part, the convex passes through the fourth through hole, and the connection structure is detachably connected with the mounting shell.

3. The lighting device according to claim 2, wherein the convex is provided with a first positioning groove, the inner wall of the lampshade is provided with a first positioning column, when the lampshade is covered on the mounting shell, one end of the first positioning column is inserted into the first positioning groove.

4. The lighting device according to claim 1, wherein the first connection strip is provided with a boss, and the first through hole penetrates the boss.

5. The lighting device according to claim 1, wherein a length of the second connection strip is greater than a length of the first connection strip.

6. The lighting device according to claim 1, wherein the fixing member comprises a plug portion, the plug portion is configured to insert into the first through hole and the second through hole, the sizes of the plug portion, the first through hole and the second through hole match each other.

7. The lighting device according to claim 6, wherein the fixing member further comprises a handle portion, the handle portion is connected to one end of the plug portion, and the handle portion protrudes from the plug portion.

8. The lighting device according to claim 1, wherein the light emitting portion comprises a light board, a plurality of LED lamp beads are configured on the light board, the light board is arranged around an inner wall of the edge of the mounting shell.

9. The lighting device according to claim 8, wherein the power supply device comprises a battery compartment, a control switch and a control mainboard, the battery compartment is configured on an inner wall of the mounting shell, the battery compartment is configured to install the battery, the battery compartment and the light board are electrically connected to the control mainboard respectively, the control mainboard is configured to control the voltage and change a flashing mode of the LED lamp beads, the control switch is configured on the mounting shell, the control switch is electrically connected to the control mainboard, and the control switch is configured to control the power on and off of the light board and switch the flashing mode of the LED lamp beads.

10. The lighting device according to claim 9, wherein the battery compartment is provided with a shielding portion, the shielding portion is configured to prevent the batteries installed in the battery compartment from leaving the battery compartment.

11. The lighting device according to claim 10, wherein the shielding portion covers part of the battery compartment.

12. The lighting device according to claim 10, wherein an inner wall of the lampshade is provided with the plurality of clamping strips, when the lampshade is covered on the mounting shell, the clamping strips are located on the top of the battery compartment to prevent the batteries installed in the battery compartment from leaving the battery compartment.

13. The lighting device according to claim 10, wherein the battery compartment further comprises a cover body, the cover body is detachably connected to the mounting shell, and the cover body prevents the batteries installed in the battery compartment from leaving the battery compartment.

14. The lighting device according to claim 8, wherein a plurality of pressing blocks are arranged on the inner wall of the edge of the lampshade, when the lampshade is covered on the mounting shell, the pressing blocks abut against the lamp board.

15. The lighting device according to claim 8, wherein the power supply device comprises a wire, the control switch, the control mainboard and a power connector, one end of the wire is electrically connected to the light board, the control board is integrated in the control switch, the control switch is configured on the wire, the control switch is configured to control the power on and off of the light board and switch the flashing mode of the LED lamp beads, the power connector is connected to the other end of the wire, and the power connector is configured to connect to an external power source.

16. The lighting device according to claim 1, wherein the lampshade further comprises a reflective strip, the lampshade is provided with a mounting groove, and the reflective strip is detachably installed in the mounting groove.

17. The lighting device according to claim 16, wherein the reflective strip is provided with a second positioning column, the mounting groove is provided with a second positioning groove, the second positioning column inserts into the second positioning groove, and the reflective strip is detachably connected to the lampshade.

18. The lighting device according to claim 1, wherein the inner wall of the edge of the mounting shell is provided with a plurality of slots, the inner wall of the edge of the lampshade is provided with a plurality of clip blocks, when the lampshade is covered on the mounting shell, the clip blocks are clamped into the slots, and the lampshade is detachably connected with the mounting shell.

19. A lighting device, comprising:

a lighting device body and a connection structure, wherein the lighting device body comprises a mounting shell, the mounting shell is provided with a receiving groove, a light emitting portion for emitting light, the light emitting portion is located in the receiving groove, a lampshade is configured for the light emitted by the light emitting portion to pass through the lampshade and irradiate the outside, the lampshade is configured on the mounting shell, a power supply device is electrically connected to the light emitting portion to energize the light emitting portion, the connection structure comprises a first connection strip, a second connection strip and a fixing member, the fixing member connects the first connection strip and the second connection strip, the connection structure is detachably connected to the mounting shell, and the lighting device is detachably disposed on an external object through the connection structure;

the lampshade further comprises a reflective strip, the lampshade is provided with a mounting groove facing outside, and the reflective strip is detachably installed in the mounting groove, and the reflective strip is configured for reflecting outside light, thereby serving as a warning to surrounding crowd.

* * * * *